United States Patent
Afework et al.

(10) Patent No.: US 12,545,612 B2
(45) Date of Patent: Feb. 10, 2026

(54) DEVICE FOR DEWATERING AND METHOD OF MAKING SAME

(71) Applicant: Canadian National Railway Company, Montreal (CA)

(72) Inventors: Seble Afework, Maple (CA); Christina Chan, Vancouver (CA); Jill Lam, Vancouver (CA)

(73) Assignee: Canadian National Railway Company, Montreal (CA)

( * ) Notice: Subject to any disclaimer, the term of this patent is extended or adjusted under 35 U.S.C. 154(b) by 126 days.

(21) Appl. No.: 18/634,434

(22) Filed: Apr. 12, 2024

(65) Prior Publication Data
US 2024/0254028 A1  Aug. 1, 2024

Related U.S. Application Data

(63) Continuation of application No. 17/244,460, filed on Apr. 29, 2021, now abandoned.

(60) Provisional application No. 63/017,378, filed on Apr. 29, 2020.

(51) Int. Cl.
*C02F 11/12* (2019.01)
*D03D 15/217* (2021.01)

(52) U.S. Cl.
CPC ............ *C02F 11/12* (2013.01); *D03D 15/217* (2021.01)

(58) Field of Classification Search
None
See application file for complete search history.

(56) References Cited

U.S. PATENT DOCUMENTS

| 490,103 | A | | 1/1893 | Collins | |
|---|---|---|---|---|---|
| 2,063,086 | A | * | 12/1936 | Fitz Gerald | B01D 27/02 210/288 |
| 2,087,157 | A | * | 7/1937 | Lind | B01J 49/10 141/2 |
| 2,117,091 | A | * | 5/1938 | Gudmundsen | B01J 47/012 210/282 |
| 2,119,895 | A | | 6/1938 | Sutton | |

(Continued)

FOREIGN PATENT DOCUMENTS

| CA | 2625964 | 12/2012 |
|---|---|---|
| CA | 2651132 | 3/2015 |

(Continued)

OTHER PUBLICATIONS

Examiner's Report issued on Apr. 2, 2024 in connection with Canadian Patent Application No. 3,175,886—4 pages.

(Continued)

*Primary Examiner* — Robert J Popovics
(74) *Attorney, Agent, or Firm* — Fish & Richardson P.C.

(57) ABSTRACT

The present disclosure generally relates to a device for dewatering a material. The device comprises a biodegradable, permeable enclosure configured for receiving the material through an inlet. The permeable enclosure comprises layered biodegradable textiles, an inner portion and an outer portion, derived from renewable resources. The inner portion has an apparent opening size between about 0.5 mm and 3 mm. The outer portion has a ratio of the minimum tensile strength in the warp direction to the minimum tensile strength in the weft direction of about 2.5.

23 Claims, 6 Drawing Sheets

(56) References Cited

U.S. PATENT DOCUMENTS

| | | | |
|---|---|---|---|
| 2,183,877 A * | 12/1939 | Wilkinson | B01D 27/02 |
| | | | 210/453 |
| 2,323,629 A | 7/1943 | Spanel | |
| 2,482,665 A * | 9/1949 | Geyer | B01L 7/00 |
| | | | 219/535 |
| 3,203,551 A * | 8/1965 | Loan, Jr. | B01D 29/27 |
| | | | 55/369 |
| 3,263,813 A * | 8/1966 | Keller | B01D 24/14 |
| | | | 210/279 |
| 3,340,919 A | 9/1967 | Render | |
| 3,419,151 A | 12/1968 | Smith et al. | |
| 3,612,278 A | 10/1971 | Dieterich | |
| 3,724,177 A * | 4/1973 | Grote | B01D 53/02 |
| | | | 96/132 |
| 3,886,751 A | 6/1975 | Porraz Jimenez Labora et al. | |
| 3,957,098 A | 5/1976 | Hepworth et al. | |
| 3,959,138 A * | 5/1976 | Nichols | B01D 29/232 |
| | | | 210/94 |
| 4,260,496 A | 4/1981 | Beer | |
| 4,303,519 A | 12/1981 | DelVecchio | |
| 4,362,433 A | 12/1982 | Wagner et al. | |
| 4,441,627 A | 4/1984 | Takeuchi | |
| 4,449,847 A | 5/1984 | Scales et al. | |
| 4,483,641 A | 11/1984 | Stoll | |
| 4,502,815 A | 3/1985 | Scales et al. | |
| 4,518,507 A | 5/1985 | Conner | |
| 4,555,201 A | 11/1985 | Paoluccio | |
| 4,592,675 A | 6/1986 | Scales et al. | |
| 4,629,651 A | 12/1986 | Davis | |
| 4,668,388 A | 5/1987 | Dibble et al. | |
| 4,681,688 A | 7/1987 | Sondov et al. | |
| 4,690,585 A | 9/1987 | Holmberg | |
| 4,929,353 A | 5/1990 | Harris | |
| 4,966,491 A | 10/1990 | Ample | |
| 5,030,031 A | 7/1991 | Brown | |
| 5,059,065 A | 10/1991 | Doolaege | |
| 5,098,754 A | 3/1992 | Horstmyer | |
| 5,121,996 A | 6/1992 | Scarrow | |
| 5,158,395 A | 10/1992 | Holmberg | |
| 5,183,086 A | 2/1993 | Fanta et al. | |
| 5,232,429 A | 8/1993 | Cizek et al. | |
| 5,308,107 A | 5/1994 | Watanabe et al. | |
| 5,405,217 A | 4/1995 | Dias et al. | |
| 5,433,851 A | 7/1995 | Itoh | |
| 5,439,598 A | 8/1995 | Clough | |
| 5,481,790 A | 1/1996 | Koreis et al. | |
| 5,505,557 A | 4/1996 | Bradley | |
| 5,573,349 A | 11/1996 | Paoluccio | |
| 5,595,652 A * | 1/1997 | Rainer | C22B 3/42 |
| | | | 521/25 |
| 5,660,802 A * | 8/1997 | Archer | E03B 7/074 |
| | | | 210/764 |
| 5,669,732 A | 9/1997 | Truitt | |
| 5,695,651 A | 12/1997 | Froud | |
| 5,707,535 A | 1/1998 | Harris | |
| 5,776,567 A | 7/1998 | Schilling et al. | |
| 5,810,510 A * | 9/1998 | Urriola | E02B 11/005 |
| | | | 210/170.03 |
| 5,826,919 A | 10/1998 | Bravo et al. | |
| 5,851,072 A | 12/1998 | Lafleur | |
| 5,851,391 A | 12/1998 | Ozawa | |
| 5,853,247 A | 12/1998 | Shroyer | |
| 5,865,564 A | 2/1999 | Miller et al. | |
| 5,902,070 A | 5/1999 | Bradley | |
| 5,948,249 A * | 9/1999 | Scott | B01D 29/111 |
| | | | 210/232 |
| 6,004,461 A | 12/1999 | Harris | |
| 6,013,343 A | 1/2000 | Radke et al. | |
| 6,056,438 A | 5/2000 | Bradley | |
| 6,132,612 A * | 10/2000 | Bourgeois | B01J 49/08 |
| | | | 210/284 |
| 6,135,293 A | 10/2000 | Herbst | |
| 6,146,540 A | 11/2000 | Nakamura et al. | |
| 6,179,521 B1 | 1/2001 | Muramatsu et al. | |
| 6,186,701 B1 | 2/2001 | Kempers | |
| 6,200,067 B1 | 3/2001 | Pena | |
| 6,253,585 B1 * | 7/2001 | Wright | D06F 39/10 |
| | | | 68/18 F |
| 6,575,629 B1 | 6/2003 | Perkins | |
| 6,623,214 B1 | 9/2003 | Hauske et al. | |
| 6,641,329 B1 | 11/2003 | Clement | |
| 6,718,896 B2 | 4/2004 | Davenport | |
| 6,739,274 B2 | 5/2004 | Eagles et al. | |
| 6,857,819 B2 * | 2/2005 | Gunderson, III | B01D 17/0202 |
| | | | 405/60 |
| 6,860,218 B2 | 3/2005 | Eagles et al. | |
| 6,875,350 B2 * | 4/2005 | Allard | B01D 29/902 |
| | | | 210/170.03 |
| 6,905,289 B1 | 6/2005 | Sanguinetti | |
| 7,021,869 B2 | 4/2006 | Sanguinetti | |
| 7,045,068 B2 | 5/2006 | Hutchinson et al. | |
| 7,097,390 B1 | 8/2006 | Moss | |
| 7,112,283 B2 | 9/2006 | Stephens | |
| 7,114,879 B2 | 10/2006 | Obermeyer et al. | |
| 7,226,240 B2 | 6/2007 | Tyler | |
| 7,314,336 B2 | 1/2008 | Moss | |
| 7,357,598 B1 | 4/2008 | Bradley | |
| 7,452,165 B2 | 11/2008 | Tyler | |
| 7,454,847 B1 | 11/2008 | Miller | |
| 7,501,360 B2 | 3/2009 | Heezen et al. | |
| 7,740,420 B2 | 6/2010 | Jones et al. | |
| 7,820,045 B2 | 10/2010 | Caughman | |
| D630,295 S * | 1/2011 | Bechtold, Jr. | D23/209 |
| 7,874,767 B2 | 1/2011 | Jones et al. | |
| 7,891,914 B2 | 2/2011 | Smallwood et al. | |
| 8,070,960 B2 | 12/2011 | Conwell | |
| 8,088,117 B2 | 1/2012 | Stephens | |
| 8,252,705 B2 | 8/2012 | King et al. | |
| 8,262,853 B2 | 9/2012 | Holtzapple et al. | |
| 8,333,220 B2 | 12/2012 | King | |
| 8,382,400 B2 | 2/2013 | Powell | |
| 8,439,607 B2 | 5/2013 | Tyler | |
| 8,511,895 B2 | 8/2013 | Burchfield et al. | |
| 8,598,054 B2 | 12/2013 | King et al. | |
| 8,777,523 B2 | 7/2014 | Stephens et al. | |
| 8,801,286 B2 | 8/2014 | Tatsuno | |
| 8,814,429 B2 | 8/2014 | Roether et al. | |
| 8,821,076 B2 | 9/2014 | Tyler | |
| 8,840,338 B2 | 9/2014 | Mills et al. | |
| 8,864,424 B2 | 10/2014 | Jones et al. | |
| 8,888,406 B2 | 11/2014 | Keaton | |
| 9,011,005 B2 | 4/2015 | Lin et al. | |
| 9,044,795 B2 | 6/2015 | Tyler | |
| 9,109,860 B2 | 8/2015 | Welker et al. | |
| 9,163,373 B2 | 10/2015 | Bradley et al. | |
| D742,997 S * | 11/2015 | Sgroi, Jr. | D23/207 |
| 9,188,409 B2 | 11/2015 | Sagebiel et al. | |
| 9,192,108 B2 | 11/2015 | Kertscher et al. | |
| 9,261,333 B2 | 2/2016 | Guo et al. | |
| 9,297,133 B2 | 3/2016 | Mills et al. | |
| 9,346,427 B2 | 5/2016 | Dobriski et al. | |
| 9,388,568 B2 | 7/2016 | Tinianov | |
| 9,404,233 B2 | 8/2016 | Jones et al. | |
| 9,580,038 B2 | 2/2017 | Palmer et al. | |
| 9,663,290 B2 | 5/2017 | Joshi et al. | |
| 9,677,694 B2 | 6/2017 | Kim | |
| 9,745,713 B2 | 8/2017 | Breitenbeck | |
| D798,996 S * | 10/2017 | Sgroi, Jr. | D23/207 |
| 9,845,583 B1 | 12/2017 | Tsai | |
| 9,966,750 B2 | 5/2018 | Skiotys | |
| 9,982,406 B2 | 5/2018 | Bradley et al. | |
| 10,022,656 B2 | 7/2018 | Day | |
| D828,488 S * | 9/2018 | Sgroi, Jr. | D23/207 |
| 10,267,004 B2 | 4/2019 | Smith | |
| 10,532,933 B2 * | 1/2020 | Bell | B01D 29/27 |
| 10,605,390 B2 | 3/2020 | Wilke | |
| 10,707,802 B1 | 7/2020 | Materna et al. | |
| 10,829,396 B2 * | 11/2020 | Camp | C02F 1/001 |
| 10,858,794 B2 | 12/2020 | Ferraiolo | |
| D907,742 S * | 1/2021 | Camp | D7/400 |
| D911,486 S * | 2/2021 | Sgroi, Jr. | D23/207 |
| D958,928 S * | 7/2022 | Patterson | C02F 3/00 |
| | | | D23/207 |

(56) References Cited

U.S. PATENT DOCUMENTS

| | | | |
|---|---|---|---|
| 11,535,530 B2* | 12/2022 | Camp | C02F 1/42 |
| 11,578,778 B2* | 2/2023 | LaCrosse | F16F 13/10 |
| 11,911,720 B2* | 2/2024 | Adams | B01D 29/31 |
| 2002/0030055 A1 | 3/2002 | Maturana | |
| 2003/0031511 A1 | 2/2003 | Tyler | |
| 2003/0035689 A1 | 2/2003 | Metz | |
| 2003/0136719 A1* | 7/2003 | Allard | B01D 37/025 |
| | | | 210/209 |
| 2004/0035781 A1 | 2/2004 | Egan | |
| 2004/0140041 A1 | 7/2004 | Glick | |
| 2005/0123221 A1 | 6/2005 | Wang | |
| 2005/0163568 A1 | 7/2005 | Sanguinetti | |
| 2006/0072969 A1 | 4/2006 | Obermeyer et al. | |
| 2006/0081340 A1 | 4/2006 | Kneebone | |
| 2006/0102565 A1* | 5/2006 | Alford | C02F 11/128 |
| | | | 210/770 |
| 2006/0127182 A1 | 6/2006 | Sanguinetti | |
| 2006/0165320 A1 | 7/2006 | Stephens | |
| 2006/0280563 A1 | 12/2006 | Glick | |
| 2007/0003369 A1 | 1/2007 | Hanson | |
| 2007/0041793 A1 | 2/2007 | Moss | |
| 2007/0224004 A1 | 9/2007 | Tyler | |
| 2008/0016759 A1 | 1/2008 | Tyler | |
| 2008/0078714 A1 | 4/2008 | Henkin et al. | |
| 2008/0095581 A1 | 4/2008 | Tasker | |
| 2008/0138157 A1 | 6/2008 | Kim | |
| 2009/0129866 A1* | 5/2009 | Smallwood | E02D 17/202 |
| | | | 405/16 |
| 2009/0208288 A1 | 8/2009 | Stephens et al. | |
| 2010/0014788 A1 | 1/2010 | Powell | |
| 2010/0303548 A1 | 12/2010 | Daily | |
| 2011/0083768 A1 | 4/2011 | Sims et al. | |
| 2011/0250448 A1 | 10/2011 | Jones et al. | |
| 2011/0284442 A1* | 11/2011 | Williams | B01D 29/58 |
| | | | 210/170.09 |
| 2012/0051673 A1 | 3/2012 | Wang | |
| 2012/0055861 A1 | 3/2012 | Conwell | |
| 2012/0261329 A1* | 10/2012 | Quintel | B01D 39/083 |
| | | | 29/527.1 |
| 2013/0048138 A1 | 2/2013 | Bradley et al. | |
| 2013/0195556 A1 | 8/2013 | Mills et al. | |
| 2013/0223940 A1 | 8/2013 | Keaton et al. | |
| 2013/0244521 A1 | 9/2013 | Jones et al. | |
| 2013/0252316 A1 | 9/2013 | Tyler | |
| 2014/0010601 A1 | 1/2014 | Bradley | |
| 2014/0099850 A1 | 4/2014 | King et al. | |
| 2014/0230954 A1 | 8/2014 | Tyler | |
| 2014/0341652 A1 | 11/2014 | Besseling et al. | |
| 2014/0377006 A1 | 12/2014 | Mills et al. | |
| 2015/0198268 A1 | 7/2015 | Kim | |
| 2015/0240437 A1 | 8/2015 | Goddard et al. | |
| 2015/0259870 A1 | 9/2015 | Tyler | |
| 2018/0045348 A1 | 2/2018 | Wilke | |
| 2018/0051433 A1 | 2/2018 | Smith | |
| 2018/0065763 A1 | 3/2018 | Nienberg | |
| 2018/0194646 A1* | 7/2018 | Camp | B01J 47/024 |
| 2018/0272256 A1* | 9/2018 | Bell | B01D 29/27 |
| 2019/0118680 A1 | 4/2019 | Sagebiel | |
| 2019/0145028 A1 | 5/2019 | Jones et al. | |
| 2019/0234042 A1 | 8/2019 | Burkett | |
| 2020/0001214 A1* | 1/2020 | Adams | C02F 1/004 |
| 2020/0032472 A1 | 1/2020 | Ferraiolo | |
| 2020/0080272 A1 | 3/2020 | Hawkinson | |
| 2021/0024380 A1* | 1/2021 | Camp | B01D 15/361 |
| 2021/0222388 A1 | 7/2021 | Faucette | |
| 2021/0340046 A1* | 11/2021 | Afework | D03D 15/573 |
| 2024/0254028 A1* | 8/2024 | Afework | D03D 1/00 |

FOREIGN PATENT DOCUMENTS

| | | |
|---|---|---|
| CA | 2697662 | 5/2017 |
| CA | 2795943 | 3/2018 |
| CA | 2795939 | 5/2018 |
| CA | 2875656 | 1/2019 |
| CA | 2901408 | 1/2021 |
| CA | 3116876 | 1/2023 |
| CA | 3019954 | 5/2023 |

OTHER PUBLICATIONS

Notice of Allowance issued on May 13, 2024 in connection with Canadian Patent Application No. 3,175,886—1 page.
Examiner's Report issued Mar. 23, 2022 in connection with Canadian Patent Application No. 3,116,876—5 pages.
Examiner's Report issued on Aug. 17, 2022 in connection with Canadian Patent Application No. 3,116,876—3 pages.
Notice of Allowance issued on Oct. 5, 2022 in connection with Canadian Patent Application No. 3,116,876—1 page.
Restriction Requirement issued on Mar. 23, 2023 in connection with U.S. Appl. No. 17/244,460—7 pages.
Non-Final Office Action issued on Sep. 1, 2023 in connection with U.S. Appl. No. 17/244,460—42 pages.
Examiner's Report issued on Dec. 8, 2023 in connection with Canadian Patent Application No. 3175,886—4 pages.
Final Office Action issued on Dec. 14, 2023 in connection with U.S. Appl. No. 17/244,460—10 pages.

* cited by examiner

DEVICE FOR DEWATERING AND METHOD OF MAKING SAME

CROSS REFERENCE TO RELATED APPLICATIONS

This application is a continuation of U.S. patent application Ser. No. 17/244,460, filed on Apr. 29, 2021, which claims the benefit of U.S. Provisional Patent Application No. 63/017,378 filed Apr. 29, 2020, the entire contents of which are incorporated herein by reference.

TECHNICAL FIELD

The present disclosure is generally related to a device for dewatering materials, specifically to a permeable enclosure comprising layered biodegradable textiles for dewatering sludge.

BACKGROUND

Slurry is a mixture of liquid and solid components, which typically consists of fine solid particles (the solid fraction) suspended in a liquid fraction (e.g., water). Sludge is a type of slurry produced at industrial facilities, which becomes an input in waste treatment systems. The treatment of waste sludge involves the removal of the liquid fraction from the sludge, also referred to as dewatering. The liquid fraction recovered may be further treated and recycled or subjected to various extraction steps to recover value-added by-products, such as hydrocarbon oil and grease. The dewatering of the sludge to specific criteria (e.g., a targeted remaining water content, etc.) is required for transportation, re-use, or disposal of the sludge. A variety of methods and/or devices can be used for dewatering, such as drying beds, filter presses, geomembranes, centrifuges, vacuum filters, and belt presses.

Commercially available geotextile containers (e.g., tubes and bags) used for dewatering are generally made of a non-woven fabric, specifically a water-permeable plastic material such as polypropylene, polyester and/or polyethylene, with at least one opening for filing. Because such containers are typically used in the construction of hydraulic barrier structures for shore and coastal protection, the use of a water-permeable plastic material ensures that the container exhibits an extended life cycle via the required strength and longevity of the material.

The life cycle assessment of waste sludge produced at industrial facilities includes treatment to recover value-added by-products and consolidation of solids to specified criteria for transport for fill disposal at a landfill. The manufacture of commercially available geotextile tubes is not suitable for long-term disposal or hydrocarbon reclamation options. The non-woven, plastic, permeable material is conservatively designed to retain very fine solids particles with minimal degradation in most environmental conditions. Variability of industrial waste inputs can result in extended dewatering duration due to clogging of the non-woven pores of plastic geotextile materials, which impacts the efficiency of treating sludge at a consistent rate. The resistance of the plastic material to degradation, specifically in landfill conditions, prevents integration of the dewatered sludge solids as fill in the environment. Biofuel facilities also do not want synthetic material for hydrocarbon reclamation during incineration. Also, the associated environmental impact of plastics sourced from non-renewable sources should be considered in the life cycle assessment.

Accordingly, for these and other reasons, there is a need for devices for sludge dewatering, specifically geotextile-based devices, that do not exhibit the shortcomings above.

SUMMARY

According to various aspects, this disclosure relates to a device for removing liquid from a material (i.e., dewatering) and comprising a biodegradable, permeable enclosure configured for receiving the sludge material through an inlet. The permeable enclosure comprises layered biodegradable textiles, as further described below, which are derived from renewable resources.

For example, in accordance with one aspect, this disclosure relates to a device for dewatering. The device comprises a permeable enclosure comprising at least two inner layers of a first woven material and at least one outer layer of a second woven material. The device also comprises an inlet port. The first woven material has an apparent opening size (AOS) when measured according to ASTM D4751 of between about 0.5 mm and about 3 mm. The second woven material has a ratio of a minimum tensile strength in a warp direction of the second woven material to a minimum tensile strength in a weft direction of the second woven material when measured according to ASTM 4595 (minimum tensile strength ratio) of at least about 2.5.

In accordance with another aspect, this disclosure also relates to a device for dewatering. The device comprises a permeable enclosure comprising an inner portion of a first biodegradable woven material and an outer portion of a second biodegradable woven material. The device also comprises an inlet port. The first biodegradable woven material has an apparent opening size (AOS) when measured according to ASTM D4751 of between about 0.5 mm and about 3 mm. The second biodegradable woven material has a ratio of a minimum tensile strength in a warp direction of the second woven material to a minimum tensile strength in a weft direction of the second woven material when measured according to ASTM 4595 (minimum tensile strength ratio) of at least about 2.5.

In accordance with another aspect, this disclosure also relates to a device for dewatering sludge. The device comprises a permeable enclosure. The permeable enclosure comprises a top side and an opposite bottom side, the top side and the bottom side being joined to each other. The top side has a longitudinal extent and a transverse extent. The permeable enclosure also comprises an inlet port on the top side to receive sludge for filling the permeable enclosure. The inlet port is located generally centrally on the top side.

In accordance with another aspect, this disclosure also relates to a device for dewatering sludge. The device comprises a permeable enclosure. The permeable enclosure comprises a top side and an opposite bottom side, the top side and the bottom side being joined to each other. The top side has a longitudinal extent and a transverse extent. The permeable enclosure also comprises an inlet port on the top side to receive sludge for filling the permeable enclosure. The inlet port is located generally at midpoint of the longitudinal extent.

In accordance with another aspect, this disclosure also relates to a device for dewatering sludge. The device comprises a permeable enclosure. The permeable enclosure comprises a top side and an opposite bottom side, the top side and the bottom side being joined to each other. The top side has a longitudinal extent and a transverse extent. The permeable enclosure also comprises an inlet port on the top side to receive sludge for filling the permeable enclosure. The inlet port is located generally at midpoint of the transverse extent.

In accordance with another aspect, this disclosure also relates to a device for dewatering. The device comprises a permeable enclosure. The permeable enclosure comprises at least two inner layers of a first woven material and at least one outer layer of a second woven material. The permeable enclosure also comprises an inlet port. The second woven material has an apparent opening size (AOS) when measured according to ASTM D4751 that is greater than an AOS of the first woven material. The second woven material has a minimum tensile strength in a warp direction of the second woven material when measured according to ASTM 4595 that is greater than a minimum tensile strength in a warp direction of the first woven material. The second woven material has a minimum tensile strength in a weft direction of the second woven material when measured according to ASTM 4595 that is greater than a minimum tensile strength in a weft direction of the first woven material. The first woven material and the second woven material are biodegradable and derived from renewable sources.

In accordance with another aspect, this disclosure also relates to a device for dewatering. The device comprises a permeable enclosure. The permeable enclosure comprises at least two inner layers of a first woven material and at least one outer layer of a second woven material. The permeable enclosure also comprises an inlet port. The first woven material and the second woven material are biodegradable and derived from renewable sources. The device optionally has a surface area of 71 cm² and exhibits a solids concentration factor of at least 5 when dewatering a solution comprising solids for at least 24 hours.

In accordance with another aspect, this disclosure also relates to a device for dewatering. The device comprises a permeable enclosure. The permeable enclosure comprises at least two inner layers of a first woven material and at least one outer layer of a second woven material. The permeable enclosure also comprises an inlet port. The first woven material and the second woven material are biodegradable and derived from renewable sources. The device optionally has a surface area of 71 cm² and exhibits an initial dewatering rate of at least about 0.16 min$^{-1}$ for a solids content of about 11 wt %.

In accordance with another aspect, this disclosure also relates to a device for dewatering. The device comprises a permeable enclosure. The permeable enclosure comprises at least two inner layers of a first woven material and at least one outer layer of a second woven material. The permeable enclosure also comprises an inlet port. The first woven material and the second woven material are biodegradable and derived from renewable sources. The device optionally has a surface area of 8.7 m² and exhibits a solids concentration factor of at least 2 when dewatering a solution comprising solids for at least 52 days over 10 transfers.

BRIEF DESCRIPTION OF THE DRAWINGS

A detailed description of embodiments is provided below, by way of example only, with reference to the accompanying drawings, in which.

It is to be expressly understood that the description and drawings are only for the purpose of illustrating certain embodiments and are an aid for understanding. They are not intended to be limitative.

DETAILED DESCRIPTION

The present disclosure generally relates to a device for removing liquid from a material (i.e., for dewatering the material) and comprising a biodegradable, permeable enclosure configured for receiving the material through an inlet. The permeable enclosure comprises layered biodegradable textiles, as further described below, which are derived from renewable resources. The permeable enclosure produces improved separation efficiency for variable waste sludge inputs and exhibits mechanical properties generally compatible with sludge dewatering applications.

Figure 1:
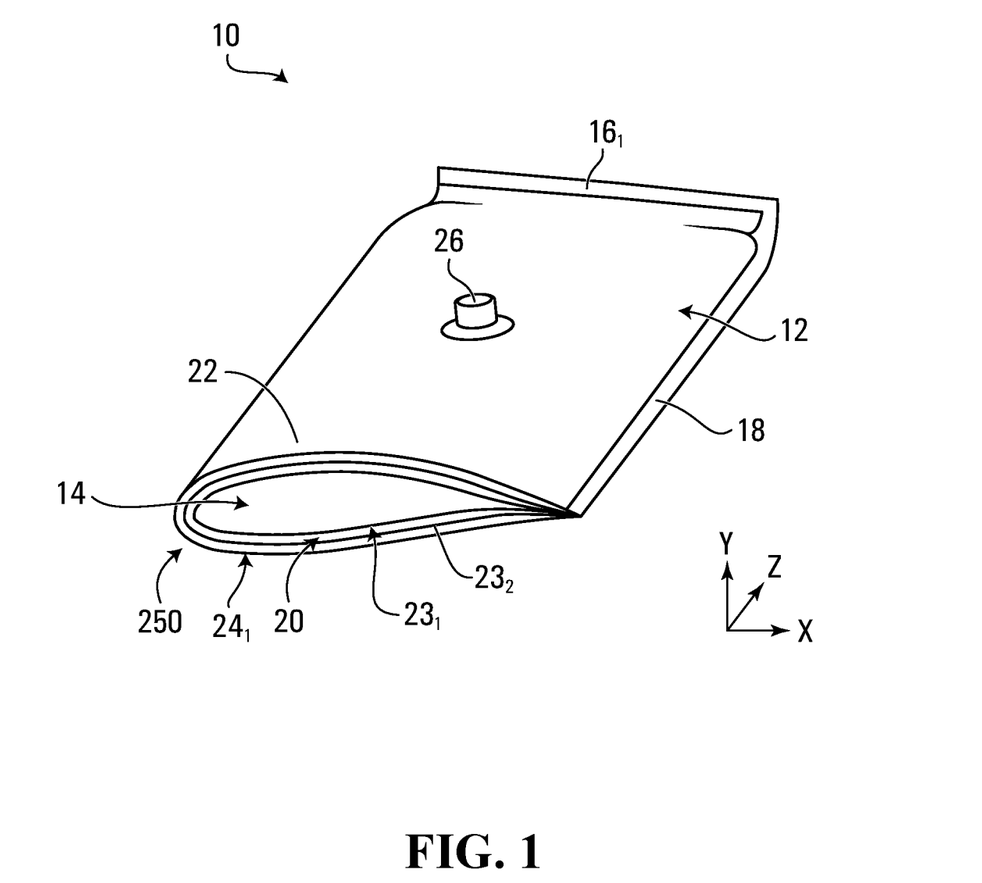
FIG. 1 shows a cutaway perspective view of a device for removing liquid from a material in accordance with an embodiment.

With further reference to FIG. 1, a non-limiting embodiment of a device 10 for removing liquid from a material (i.e., for dewatering the material) is shown. The device 10 comprises a permeable enclosure 12 configured to define a closed compartment 14 for receiving the material to be dewatered. The compartment 14 is defined via two transverse seams 16$_1$ and 16$_2$ (not shown), a longitudinal seam 18 and a fold 250 in the permeable enclosure 12, as further described below.

In this embodiment, the permeable enclosure 12 comprises an inner portion 20 and an outer portion 22, the inner portion 20 directly facing the cavity 14. The inner portion 20 may comprise at least two inner layers 23$_1$ and 23$_2$, however any other suitable number of inner layers 23$_1$ may be possible in other non-limiting examples (i.e., it may be any suitable number). Each one of the at least two inner layer 23$_1$, 23$_2$ is made of a first woven material (e.g., a woven textile or fabric) and as such may be made of a certain amount of threads. The threads of each one of the at least two inner layers 23$_1$ and 23$_2$ comprise threads woven in two directions, with a first direction of the threads being perpendicular, or substantially perpendicular, to a second direction of the threads. The first and second directions of the threads may be referred to as weft and warp directions—the warp direction referring to the lengthwise (or longitudinal) direction of the threads that are held stationary in tension on a frame (as the woven material is being made), the weft direction referring to the transverse direction (i.e., perpendicular or substantially perpendicular to the warp direction) along which the threads are drawn through and inserted over and under the threads in the warp direction to form the woven material of either one of the at least two inner layers 23$_1$ and 23$_2$.

Any suitable weave pattern and/or density of the first woven material may be used. The density of the first woven material may be defined as the number of threads per cm in the warp and weft directions. The higher the value, the more threads there are per cm, and thus the greater the density. The weave pattern may be defined as the pattern of interlacing of the threads in the warp and weft directions—plain weave for example is characterized by a repeating pattern where each warp thread is woven over on a weft thread and then under the next weft thread.

Still in this embodiment, each one of the at least two inner layers $23_1$ and $23_2$ of the inner portion 20 may be made of a single thread (i.e., the first woven material is a woven monofilament material), however either one of the at least two inner layers $23_1$ and $23_2$ may be made of a plurality of distinct threads in other embodiments. While each one of the at least two inner layer $23_1$, $23_2$ is made of the same first woven material in this embodiment, this needs not be the case in other non-limiting embodiments.

While the at least two inner layers $23_1$, $23_2$ exhibit some degree of freedom relative to each other (i.e., the inner layer $23_1$ may move relative to the inner layer $23_2$ in the x, y and z directions along substantially an entire surface of each one of the inner layers $23_1$ and $23_2$, the at least two inner layers $23_1$, $23_2$ are also secured relative to each other via the two transverse seams $16_1$ and $16_2$ and the lateral seam 18, which notably defines the sealed compartment 14.

In other non-limiting embodiments, while the at least two inner layers $23_1$, $23_2$ exhibit some degree of freedom relative to each other (i.e., the inner layer $23_1$ may move relative to the inner layer $23_2$ in the x, y and z directions along substantially an entire surface of each one of the inner layers $23_1$ and $23_2$), the at least two inner layers $23_1$, $23_2$ are also secured relative to each other via the outer portion 20 at the two transverse seams $16_1$ and $16_2$ and the lateral seam 18, which notably defines the sealed compartment 14.

The inner portion 20 may be characterized in any suitable way. For example, in this embodiment, the inner portion 20 may be characterized by an apparent opening size ("AOS") of the first woven material of which the at least two inner layers $23_1$ and $23_2$ are made, the AOS generally corresponding to the largest dimension of the opening formed by the weaving of two subsequent threads of the first woven material in both the warp and the weft directions. Within the context of the present disclosure, the AOS is therefore representative of the approximate largest opening dimension of the first woven material that is available for solid particles to pass through the inner portion 20 (i.e., to be retained by the inner portion 20, the solid particles should exhibit a largest dimension greater than the AOS of the inner portion 20). In some non-limiting examples, the AOS of the inner portion 20 when measured in accordance with ASTM D4751 may be between about 0.5 mm and 3 mm, in some cases between about 0.6 mm and 2.75 mm, in some cases between about 0.7 mm and 2.5 mm, in some cases between about 0.8 mm and 2.25 mm and in some cases between about 1 mm and 2 mm, however any other suitable AOS may be possible in other non-limiting examples. The inner portion 20 may be characterized in any other suitable manner, for example using the filtration opening size (FOS) method CAN CGSB148.1 No. 10, ASTM D6767 (Pore Size Characteristics of Geotextiles by Capillary Flow Test) and the likes.

It will be readily appreciated that when the at least two inner layers $23_1$ and $23_2$ are made of the same first woven material, the inner portion 20, the inner layer $23_1$ and the inner layer $23_2$ will each exhibit the same AOS however, when the at least two inner layers $23_1$ and $23_2$ are not made of the same first woven material, the AOS of the inner portion 20 will be based upon the lowest AOS of either one of the at least two inner layers $23_1$, $23_2$, which in this case will constitute the approximate largest opening dimension available for material to pass through the inner portion 20.

It will also be readily appreciated that the AOS of the inner portion 20 may be chosen such that at least some solid particles present in the material to be dewatered that is loaded in the sealed compartment 14, are retained within the sealed compartment 14 by the inner portion 20 (i.e., a largest dimension of the at least some of the solid particles of the material to be dewatered is greater than the AOS of the inner material 20). As such, a water fraction of the material to be dewatered may permeate through the inner portion 20 while at least some of the solid particles of the material are retained within the sealed compartment 14. As such, the AOS may generally be representative of the dewatering potential of the device 10. The AOS of the inner portion 20 may also be chosen such that clogging and/or blinding of the device 10 is minimized during operation of the device 10—for example, if it is known that the material to be dewatered comprises solid particles with a largest dimension of about 5 mm, selecting an inner portion 20 with an AOS of about 1 mm (i.e., 5 times smaller than the known largest dimension of the solid particles of the material to be dewatered) may result in clogging and/or blinding of the device 10 as a single particle may obstruct at once several openings.

The inner portion 20 (i.e., the first woven material) may also exhibit a minimum tensile strength in the warp direction when measured according to ASTM 4595 of at least about 7 kN/m, in some cases at least about 8 kN/m, in some cases at least about 9 kN/m and in some cases even more and a minimum tensile strength in the weft direction when measured according to ASTM 4595 of at least about 5 kN/m, in some cases at least about 6 kN/m, in some cases at least about 7 kN/m and in some cases even more. Still in this embodiment, a ratio of the minimum tensile strength in the warp direction to the minimum tensile strength in the weft direction of the inner portion 20 may be about 1.2, in some cases about 1.3, in some cases about 1.4 and in some cases even more.

Still in this embodiment, the first woven material may be biodegradable, i.e. it may be subject to biodegradation. Biodegradation may be defined in any suitable manner—for example the first woven material may be biodegradable as it experiences some physical and/or chemical change as a result of exposure to some environmental factor, such as but not limited to light, heat, moisture, wind, chemical conditions, or biological activity. For example, the first woven material may be degraded into carbon dioxide, water and biomass as a result of the action of microorganisms (e.g., bacteria, fungi and the likes) or enzymes. In some non-limiting examples, the first woven material may be entirely or substantially degraded in moist and warm conditions in less than 3 years, in some cases in less than 2 years, in some cases in less than 1 year and in some cases even less.

The first woven material may also be derived from renewable sources. Within the context of the present disclosure, the term renewable sources refers to sources that naturally replenish themselves to replace a portion that is depleted, used or consumed. This includes for example wood, plants and the likes. In this embodiment, the first woven material of the at least two inner layers $23_1$, $23_2$, which is biodegradable and derived from renewable sources may be any suitable material, such as but not limited to woven jute, woven hemp, woven flax and the likes.

Still in this embodiment, the device 10 also comprises an outer portion 22 comprising at least one outer layer $24_1$ made of a second woven material. In this embodiment, the second woven material is different from the first woven material. Much like the first woven material, any suitable weave pattern and/or density of the second woven material may be used such that the weave pattern and/or density of the second woven material may be identical to, substantially identical to or different from the weave pattern and/or density of the first woven material. The second woven material is a woven monofilament material in this embodiment, however it may also be made of a plurality of distinct threads in other embodiments. While the outer portion 22 may also exhibit some degree of freedom relative to the inner portion 20 along substantially an entire surface of each one of the inner and outer portions 20, 22, the outer portion 22 is also secured to the inner portion 20 via the two transverse seams $16_1$ and $16_2$ (not shown) and the lateral seam 18, thereby defining the sealed compartment 14, as further described below.

The outer portion 22 may be characterized in any suitable way. For example, the outer portion 22 may exhibit a minimum tensile strength in the warp direction when measured according to ASTM 4595 of at least about 30 kN/m, in some cases at least about 31 kN/m, in some cases at least about 32 kN/m, in some cases at least about 33 kN/m, in some cases at least about 34 kN/m, in some cases at least about 35 kN/m, in some cases at least about 36 kN/m, in some cases at least about 37 kN/m, in some cases at least about 38 kN/m, in some cases at least about 39 kN/m, in some cases at least about 40 kN/m and in some cases even more. The outer portion 22 may also exhibit a minimum tensile strength in the weft direction when measured according to ASTM 4595 of at least about 10 kN/m, in some cases at least about 11 kN/m, in some cases at least about 12 kN/m, in some cases at least about 13 kN/m, in some cases at least about 14 kN/m and in some cases even more. Still in this embodiment, a ratio of the minimum tensile strength in the warp direction to the minimum tensile strength in the weft direction of the outer portion 22 may be about 2.5, in some cases about 2.6, in some case about 2.7, in some cases about 2.8, in some cases about 2.9, in some cases about 3, in some cases about 3.1, in some cases about 3.2, in some cases about 3.3, in some cases about 3.4 and in some cases even more.

In this embodiment, the outer portion 22 generally exhibits a minimum tensile strength in the warp direction when measured according to ASTM 4595, a minimum tensile strength in the weft direction when measured according to ASTM 4595 and a ratio of the minimum tensile strength in the warp direction to the minimum tensile strength in the weft direction that are greater than those of the inner portion 20.

It will be readily appreciated that the minimum tensile strength in the warp and weft direction of the outer portion 22 may be chosen such that the outer portion 22 is configured to maintain the permeable enclosure 12 under hydraulic pressure when the device 10 is loaded with the material to be dewatered, for example when the minimum tensile strength of the outer portion 20 is at least about 36 kN/m in the warp direction and about 13 kN/m in the weft direction, specifically about 36.6 kN/m in the warp direction and about 13.8 kN/m in the weft direction.

The outer portion 22 (i.e., the second woven material) may also exhibit an AOS when measured in accordance with ASTM D4751 of between about 1 mm and about 5 mm. In a preferred embodiment, the AOS of the outer portion 22 may be greater than the AOS of the inner portion 20, the inner portion 20 being generally configured for retention of the solid particles present in the material to be dewatered, the outer portion 22 being generally configured to maintain the permeable enclosure 12 under hydraulic pressure.

Still in this embodiment, much like the first woven material, the second woven material may be biodegradable and derived from renewable sources. As such, in some non-limiting examples, the second woven material may be entirely or substantially degraded in moist and warm conditions in less than 3 years, in some cases in less than 2 years, in some cases in less than 1 year and in some cases even less.

The second woven material may be any suitable material such as but not limited to woven coir (i.e., coconut fiber), woven jute, woven hemp and the likes.

Figure 5:
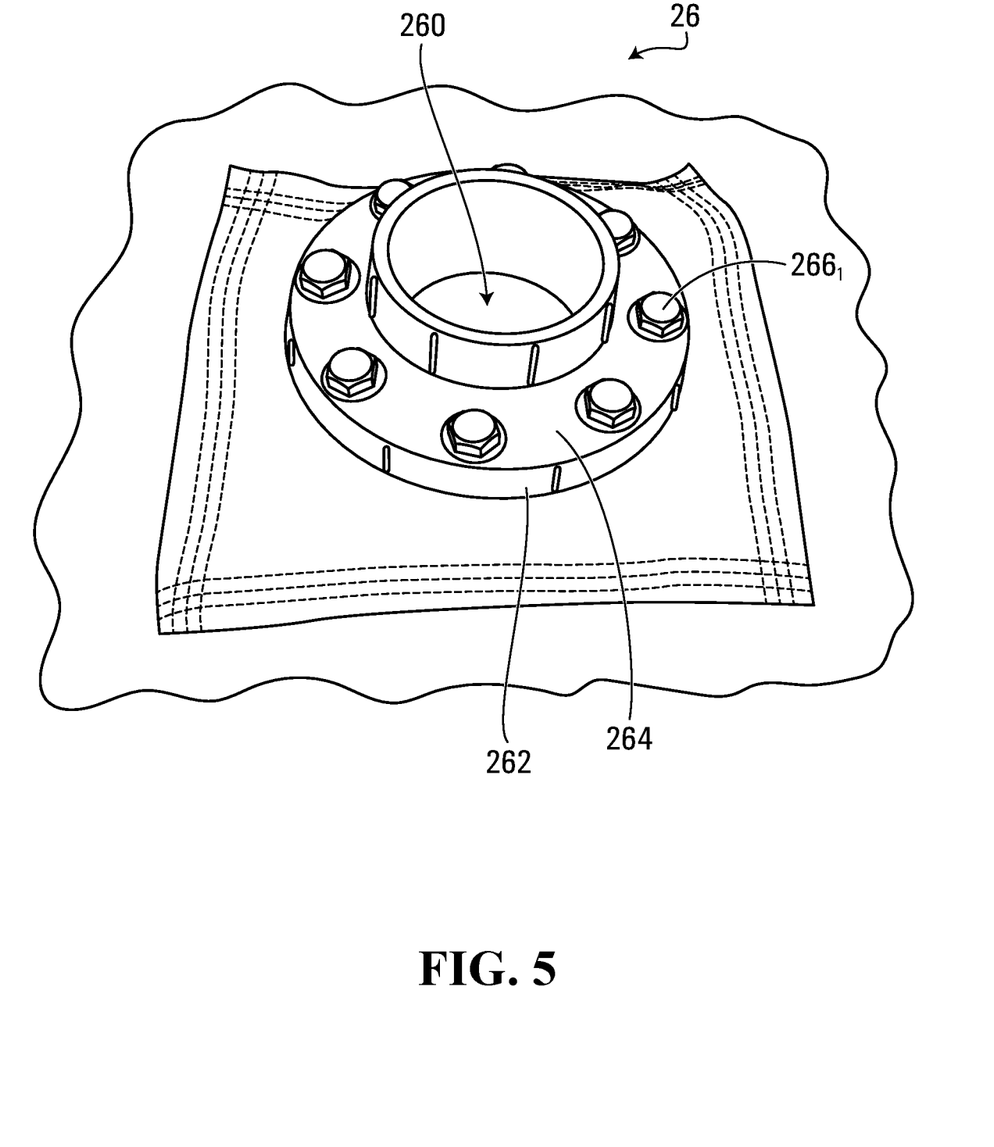
FIG. 5 is a perspective view of an inlet port of the device of FIG. 1 in accordance with one embodiment.

With further reference to FIG. 5, the device 10 also comprises an inlet port 26, the inlet port 26 being configured to engage any other corresponding port (e.g., male or female corresponding port) of a tube to convey and fill the sealed compartment 14 with the material to be dewatered. For example, the inlet port 26 allows a pump to be connected to the device 10 to fill the sealed compartment 14 with sludge. In this embodiment, the inlet port 26 may comprise an opening 260 which is sewn directly with the inner and outer portions 20, 22 of the permeable enclosure 12 and thereby directly connects with the sealed compartment 14. The opening 260 may be made of any suitable material, such as but not limited to a plastic material (e.g., reinforced polypropylene and the likes) or a metal (e.g., aluminum, steel and the likes) and may be of any suitable shape, such as but not limited to circular, square and the likes. The inlet port 26 also comprises a gasket 264 and a flange fitting 262 that are secured to the opening 260 sewn with the permeable enclosure 12 using at least one securing mean $266_1$, such as but not limited to at least one threaded fastener (e.g., bolt or screw) and the likes, which effectively creates a sealed connection between the inlet port 26 and sealed compartment 14. With respect to the length and the width of the device 10, as shown in FIG. 1, the inlet port 26 may be positioned generally in a central location of the device 10, that is generally in a middle of the length (from the first transverse seam $16_1$ to the second transverse seam $16_2$) and, even more preferably a middle of the width (from the lateral seam 18 to the fold 250) of the device 10. Without wishing to be bound by theory, the generally central location of the inlet port 26 may facilitate the homogeneous distribution of the material to be dewatered within the device 10 as it is being filled. Any other suitable configuration of the inlet port 26 may be possible in other embodiments—for example, the inlet port 26 may be positioned generally at a midpoint of the longitudinal extent, at a midpoint of the transverse extent and the likes.

The device 10 may be of any suitable dimension and may be configured to receive any suitable volume of the material to be dewatered. For example, in some embodiment, the device 10 may have a length from the first transverse seam $16_1$ to the second transverse seam $16_2$ of about 3.8 m and a width from the lateral seam 18 to the fold 250 of about 2.3 m when the device 10 is not filled with any material. The device 10 may also be configured to receive a volume of material to be dewatered of about 8 $m^3$. It will be readily appreciated that, in this embodiment, the device 10 is configured to exhibit a generally cylindrical and/or tubular shape at least along a central portion of the device 10 when the device 10 is loaded with the material to be dewatered. Without wishing to be bound by theory, the generally cylindrical and/or tubular configuration of the device 10 when loaded may minimize the potential points of failure at the seam. Any other suitable size and/volume of the device 10 may be possible in other embodiments.

Figure 2:
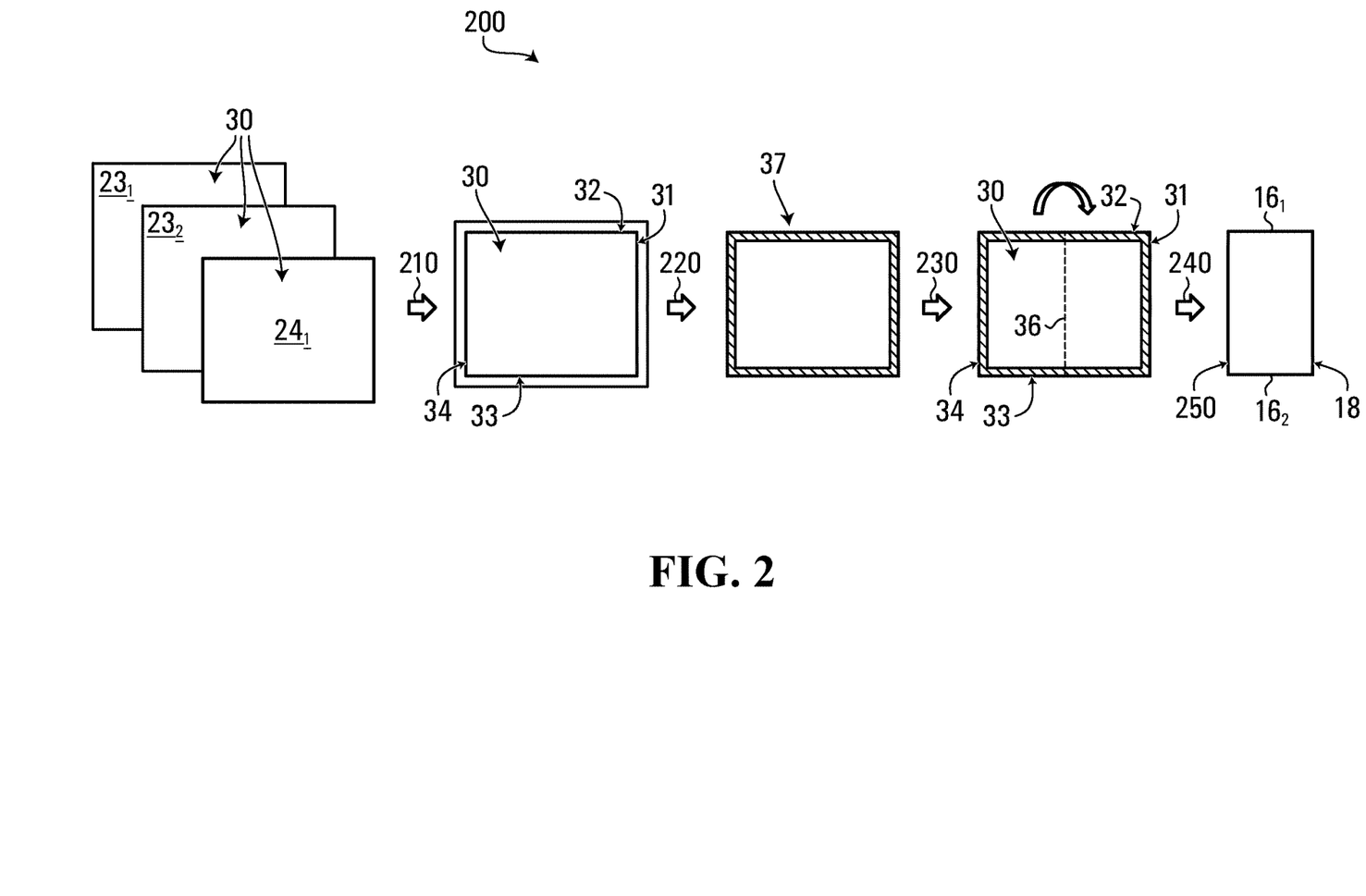
FIG. 2 shows a process for making the device of FIG. 1 in accordance with an embodiment.

With further reference to FIG. 2, a non-limiting embodiment of a process 200 for making the device 10 is shown. The at least two inner layers $23_1$ and $23_2$ and the at least one outer layer $24_1$ are first each provided with an identical, or substantially identical, shape 30 comprising four sides 31, 32, 33 and 34. While in this non-limiting example the shape 30 is square, any other suitable shape may be used in other non-limiting examples, i.e. the shape 30 may be substantially square, rectangular, substantially rectangular etc. The at least two inner layers $23_1$ and $23_2$ and the at least one outer layer $24_1$ are superposed onto each other and then sewn together at step 210 along the four sides of the shape 30 (i.e., along sides 31, 32, 33 and 34 in this non-limiting example). Each one of the sides 31, 32, 33 and 34 may then be sewn together at step 220 with a border of reinforced polypropylene (RPE) plastic 37, or any other suitable plastic. The shape 30 comprising the at least two inner layers $23_1$ and $23_2$ and the at least one outer layer $24_1$ sewn together along sides 31, 32, 33 and 34 may then be folded along an axis 36 at step 230 and the device 10 is then formed at step 240 by sewing the border of RPE along the following sides: 32 together (i.e., 32 first half+32 second half), 33 together (i.e., 33 first half+33 second half) and 31 with 34 (31+34). It will be readily appreciated that sewing the sides 32+32 and 33+33 creates the transverse seams $16_1$ and $16_2$, respectively, while the lateral seam 18 is created via sewing the sides 31+34. In this example, the transverse seams $16_1$ and $16_2$ are therefore joined together via the lateral seam 18 on one side, and via the fold 250 in the permeable enclosure 12. Any other suitable process for making the device 10 may be possible in other embodiments.

Figure 3:
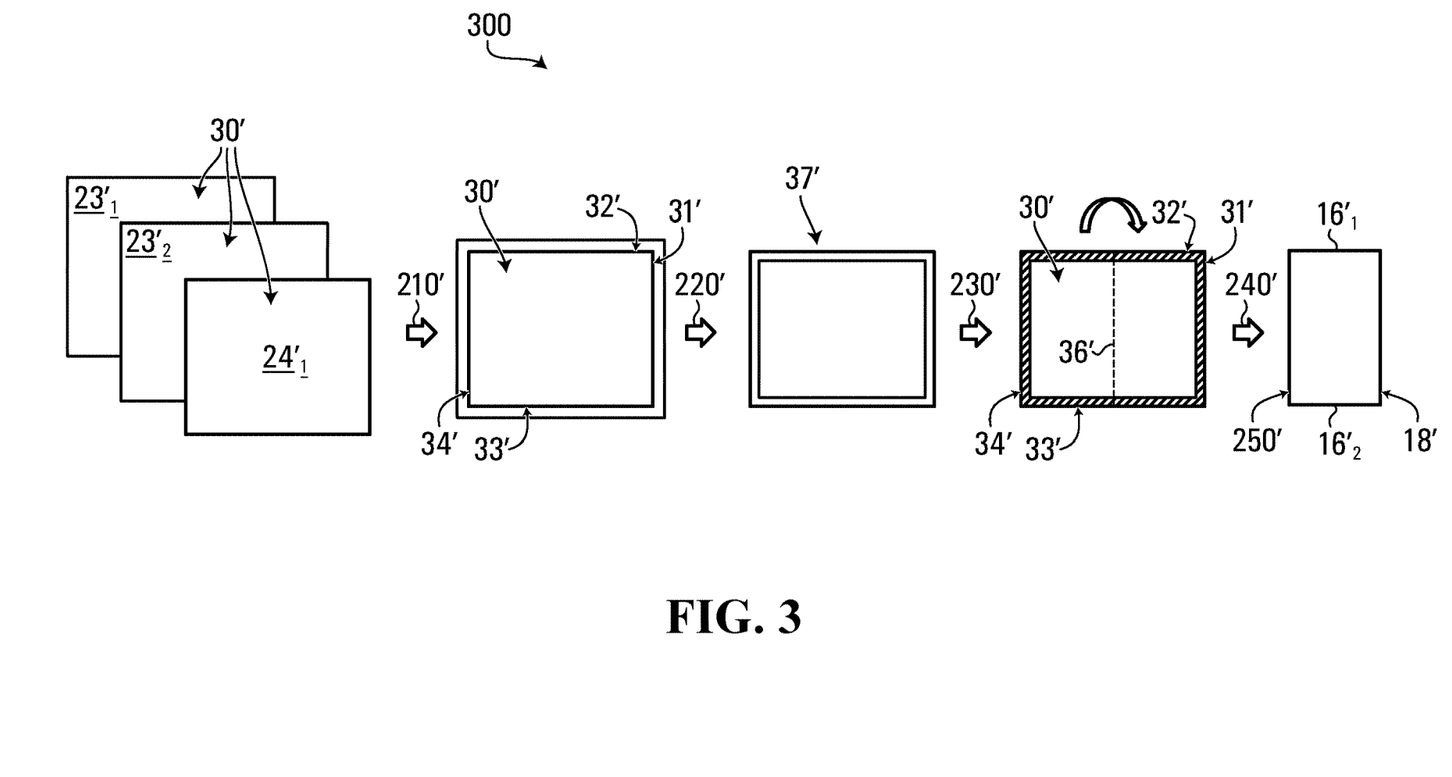
FIG. 3 is a variant of the process shown in FIG. 2 for making the device of FIG. 1.
Figure 4:
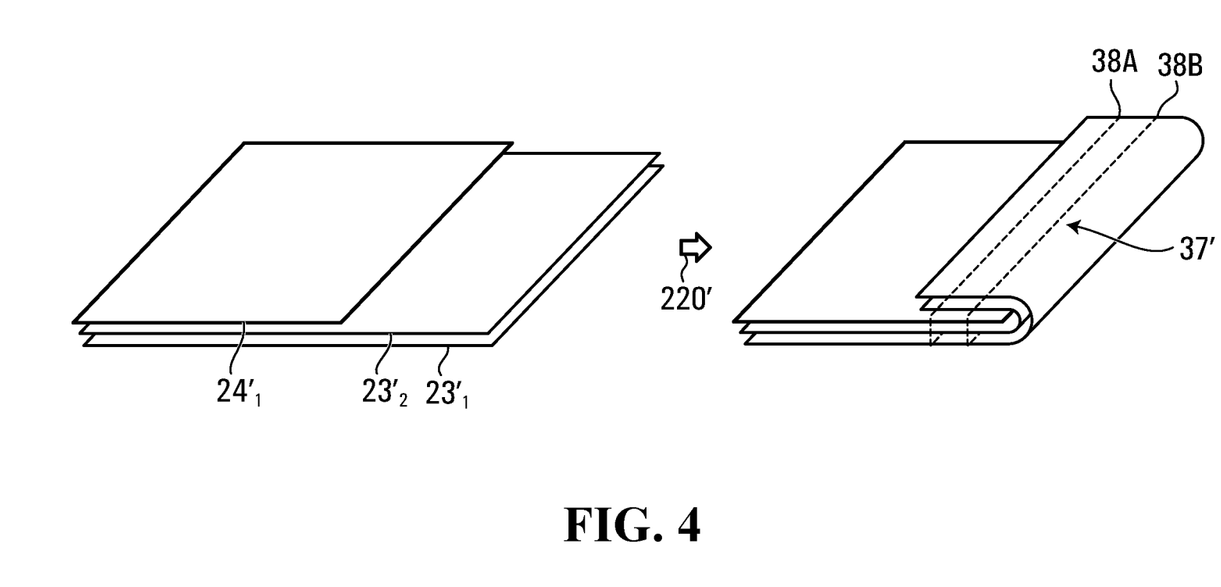
FIG. 4 is a perspective view of a folding arrangement to create the seam of the device of FIG. 1 in accordance with the embodiment in FIG. 3.

FIG. 3 shows a variant of the process described in FIG. 2. In this non-limiting embodiment, a process 300 for making the device 10 is shown. The at least two inner layers $23'_1$ and $23'_2$ and the at least one outer layer $24'_1$ are first each provided with an identical, or substantially identical, shape 30' comprising four sides 31', 32', 33' and 34'. While in this non-limiting example the shape 30' is square, any other suitable shape may be used in other non-limiting examples, i.e. the shape 30' may be substantially square, rectangular, substantially rectangular etc. The at least two inner layers $23'_1$ and $23'_2$ are larger, or substantially larger, than the at least one outer layer $24'_1$. The at least two inner layers $23'_1$ and $23'_2$ and the at least one outer layer $24'_1$ are superposed onto each other and, with further reference to FIG. 4, the at least two inner layers $23'_1$ and $23'_2$ folded over the at least one outer layer $24'_1$ at step 210' along the four sides of the shape 30' (i.e., along sides 31', 32', 33' and 34' in this non-limiting example). Each one of the sides 31', 32', 33' and 34' may then be sewn together at step 220' and over the lines 38A and 38B to create the border 37'. The shape 30' comprising the at least two inner layers $23'_1$ and $23'_2$ and the at least one outer layer $24'_1$ sewn together along sides 31', 32' and 33' may then be folded along an axis 36' at step 230' and the device 10 is then formed at step 240' by sewing the border along the following sides: 32' together (i.e., 32' first half+32' second half), 33' together (i.e., 33' first half+33' second half) and 31' with 34' (31'+34'). It will be readily appreciated that sewing the sides 32'+32' and 33'+33' creates the transverse seams $16'_1$ and $16'_2$, respectively, while the lateral seam 18' is created via sewing the sides 31'+34'. In this example, the transverse seams $16'_1$ and $16'_2$ are therefore joined together via the lateral seam 18' on one side, and via the fold 250' in the permeable enclosure 12. Any other suitable process for making the device 10 may be possible in other embodiments.

EXAMPLES

The following examples are for illustrative purposes only and are not meant to limit the scope of the device described herein.

Example 1

Dewatering tests were conducted to evaluate the sludge dewatering capabilities of various woven materials. Three devices were tested with different materials: device 1 with woven polypropylene, which is not biodegradable, not renewable and with an AOS of 0.425 mm; device 2 with a double layer of woven, biodegradable material derived from renewable sources and with an AOS of between about 1 mm and about 2 mm; and device 3 with 2 inner layers and one outer layer of woven, biodegradable material derived from renewable sources, the 2 inner layers with an AOS of between about 1 mm and about 2 mm and the outer layer with an AOS of between about 1 mm and about 5 mm. Devices 1, 2 and 3 were made using samples of the materials having a surface of about 71 $cm^2$, the devices being configured to receive a volume of sludge of about 50 L at a minimum of about 87 kPa head pressure. The sludge tested had an average solids content of 11.8 wt % and were dosed to a minimum of 40 ppm of coagulant and flocculent. The solids content (in wt %) of the retentate (i.e., dewatered sludge) and filtrate (drained fluid) were determined for quantitative comparison by performing mass measurements before and after drying in an 80° C. oven for a minimum of 24 hours. The solids concentration factor for the retentate (based on the ratio between the solid content in wt % of the retentate vs. the sludge) was also measured. The results are summarized in Table 1 below.

TABLE 1 solids content (in wt %) of sludge and retentate/filtrate after dewatering for 24 hours with devices 1, 2 and 3.

| Material | Sludge volume (L) | Solids content (wt %) | | | Solids concentration factor | Dewatering time |
| --- | --- | --- | --- | --- | --- | --- |
| | | Sludge | Retentate | Filtrate | Retentate | (hours) |
| Device 1 | 52 | 9.1 | 41.1 | <1.0 | 4.5 | 24 |
| Device 2 | 58 | 19.0 | 51.7 | 1.7 | 2.7 | 24 |
| Device 3 | 90 | 8.6 | 48.6 | <0.9 | 5.6 | 24 |

Device 3 exhibited a retentate solids content higher than that of devices 1 and 2. Similarly, the solids concentration factor obtained with device 3 was higher than the one obtained with devices 1 and 2. Also, while both devices 2 and 3 were able to dewater the tested volume of sludge using a single step of sludge transfer, device 1 required 3 different sludge transfers to address dewatering resistance. Of note, device 3 also dewatered a greater volume of sludge when compared to devices 1 and 2.

Figure 6:
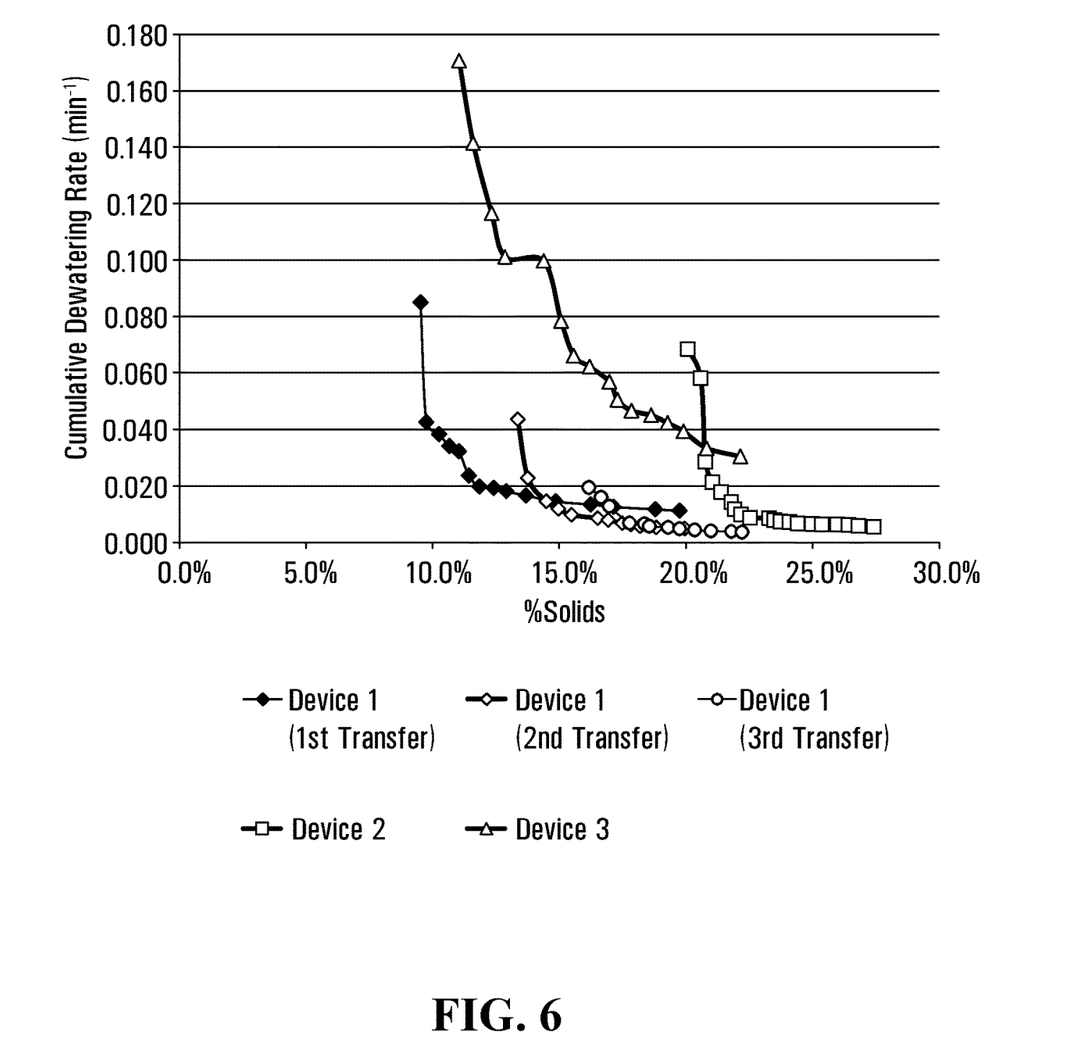
FIG. 6 shows the dewatering rates (in min$^{-1}$) during the first hour of dewatering for three dewatering devices as a function of the solids content (in wt %) of the retentate.

With further reference to FIG. 6, the cumulative dewatering rates of the filtrate (in min$^{-1}$) during the first hour of dewatering for each one of devices 1 (items A(1), A(2) and A(3) for the first, second and third sludge transfers, respectively), 2 (item B) and 3 (item C) were also measured from volume measurements at various time intervals and plotted as a function of the solids content (in wt %) of the retentate. It can be appreciated that, generally, the higher the solids content of the retentate, the lower the dewatering rate. As can be seen from FIG. 6, device 3 exhibited the highest initial dewatering rate with about 0.171 min$^{-1}$ for a solids content of about 11 wt %, decreasing to about 0.03 min$^{-1}$ for a solids content of about 22.2 wt %. By comparison, during the first transfer device 1 exhibited an initial dewatering rate of about 0.085 min$^{-1}$ for a solids content of about 9.5 wt %, while device 2 exhibited an initial dewatering rate of about 0.068 min$^{-1}$ for a solids content of about 20.1 wt %.

Example 2

Dewatering tests were conducted to evaluate the sludge dewatering capabilities of various woven materials. Two devices were tested with different materials: device 4 with woven polypropylene, which is not biodegradable, not renewable and with an AOS of 0.425 mm and device 5 with 2 inner layers and one outer layer of woven, biodegradable material derived from renewable sources, the 2 inner layers with an AOS of between about 1 mm and about 2 mm and the outer layer with an AOS of between about 1 mm and about 5 mm. Devices 4 and 5 were made using samples of the materials having a surface of about 8.7 m 2, the devices being configured to receive a volume of sludge of about 66 to 2,973 L over 10 to 17 transfers. The sludge tested had an average solids content of 40.6 wt % and were dosed to a minimum of 25 ppm of coagulant and flocculent. The solids content (in wt %) of the retentate (i.e., dewatered sludge) were determined for quantitative comparison by performing mass measurements before and after drying in an 80° C. oven for a minimum of 24 hours. The solids concentration factor for the retentate (based on the ratio between the solid content in wt % of the retentate vs. the sludge) was also measured. The results are summarized in Table 2 below.

TABLE 2 solids content (in wt %) of sludge and retentate after dewatering with devices 4 and 5.

| Material | Total sludge volume (L) | Solids content (wt %) Sludge | Solids content (wt %) Retentate | Solids concentration factor Retentate | Total sludge transfers | Total dewatering time (days) |
|---|---|---|---|---|---|---|
| Device 4 | 7,347 | 49.1 | 78.1 | 1.6 | 17 | 109 |
| Device 5 | 7,235 | 32.1 | 68.0 | 2.1 | 10 | 52 |

The solids concentration factor obtained with device 5 was higher than the one obtained with device 4. Also, device 5 was able to dewater a comparable total tested volume of sludge with 10 sludge transfers in comparison to device 4 that required 17 sludge transfers. Of note, device 5 also dewatered a comparable volume of sludge in fewer days than device 4.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A device for dewatering, the device comprising:
   a. a permeable enclosure, the permeable enclosure comprising:
      i. at least two inner layers of a first woven material; and
      ii. at least one outer layer of a second woven material,
   b. an inlet port;
   wherein, the first woven material has an apparent opening size (AOS) of between about 0.5 mm and about 3 mm, wherein the second woven material has a ratio of a minimum tensile strength in a warp direction of the second woven material to a minimum tensile strength in a weft direction of the second woven material of at least about 2.5.

2. The device according to claim 1, wherein the AOS of the first woven material is between about 1 mm and about 2 mm.

3. The device according to claim 1, wherein the second woven material has an AOS of between about 1 mm and about 5 mm.

4. The device according to claim 1, wherein the minimum tensile strength in the warp direction of the second woven material is at least about 36 kN/m.

5. The device according to claim 1, wherein the minimum tensile strength in the weft direction of the second woven material is at least about 13 kN/m.

6. The device according to claim 1, wherein the second woven material has an AOS of between about 1 mm and about 5 mm.

7. The device according to claim 1, wherein the first woven material has a minimum tensile strength ratio of at least about 1.2.

8. The device according to claim 7, wherein the minimum tensile strength in the warp direction of the first woven material is at least about 8 kN/m.

9. The device according to claim 7, wherein the minimum tensile strength in the weft direction of the first woven material is at least about 6 kN/m.

10. The device according to claim 1, wherein the first woven material and the second woven material are monofilament materials.

11. The device according to claim 10, wherein the first woven material and the second woven material are made from renewable sources.

12. The device according to claim 11, wherein the first woven material is selected from the group consisting of woven jute, woven hemp and woven flax.

13. The device according to claim 11, wherein the second woven material is woven coir.

14. The device according to claim 1, wherein the device comprises borders reinforced with polypropylene.

15. The device according to claim 1, wherein borders of the device comprise the at least two inner layers of the first woven material folded over the least one outer layer of the second woven material and sewn together.

16. The device according to claim 1, wherein the inlet port is generally positioned at one of a central location, midpoint of a longitudinal extent, or midpoint of a transverse extent of the device.

17. A device for dewatering, the device comprising:
   a. a permeable enclosure, the permeable enclosure comprising:
      i. at least two inner layers of a first woven material;
      ii. at least one outer layer of a second woven material, and
   b. an inlet port;
wherein the second woven material has an apparent opening size (AOS) that is greater than an AOS of the first woven material,
wherein the second woven material has a minimum tensile strength in a warp direction of the second woven material that is greater than a minimum tensile strength in a warp direction of the first woven material,
wherein the second woven material has a minimum tensile strength in a weft direction of the second woven material that is greater than a minimum tensile strength in a weft direction of the first woven material,
wherein the first woven material and the second woven material are made from renewable sources.

18. The device according to claim 17, wherein the first woven material and the second woven material are monofilament materials.

19. The device according to claim 17, wherein the first woven material is selected from the group consisting of woven jute, woven hemp and woven flax.

20. The device according to claim 19, wherein the second woven material is woven coir.

21. The device according to claim 17, wherein the device comprises borders reinforced with polypropylene.

22. The device according to claim 17, wherein the device comprises borders of the at least two inner layers of the first woven material folded over the least one outer layer of the second woven material and sewn together.

23. The device according to claim 17, wherein the inlet port is generally positioned at one of a central location, midpoint of a longitudinal extent, or midpoint of a transverse extent of the device.

* * * * *